United States Patent
Grieve et al.

(10) Patent No.: US 7,306,871 B2
(45) Date of Patent: Dec. 11, 2007

(54) HYBRID POWER GENERATING SYSTEM COMBINING A FUEL CELL AND A GAS TURBINE

(75) Inventors: Malcolm J. Grieve, Fairport, NY (US); John A. MacBain, Carmel, IN (US); Kaushik Rajashekara, Carmel, IN (US); Gregory W. Alexander, Pittsford, NY (US); Brett W. Buck, Middletown, IN (US); Daniel D. Richey, New Castle, IN (US)

(73) Assignee: Delphi Technologies, Inc., Troy, MI (US)

( * ) Notice: Subject to any disclaimer, the term of this patent is extended or adjusted under 35 U.S.C. 154(b) by 586 days.

(21) Appl. No.: 10/793,303

(22) Filed: Mar. 4, 2004

(65) Prior Publication Data

US 2005/0196659 A1    Sep. 8, 2005

(51) Int. Cl.
    H01M 2/02    (2006.01)
(52) U.S. Cl. .......................... 429/34; 429/18; 429/26; 429/30; 180/65.3
(58) Field of Classification Search ................ 429/34, 429/30, 32, 17, 12, 13, 19, 26; 180/65.3; 60/805, 801, 39.27, 39.43
See application file for complete search history.

(56) References Cited

U.S. PATENT DOCUMENTS 5,314,761 A    5/1994    Pietrogrande et al.
5,417,051 A    5/1995    Ankersmit et al.
2004/0131912 A1*    7/2004    Keefer et al. ................. 429/34
2004/0150366 A1*    8/2004    Ferrall et al. ............... 320/101
2004/0241505 A1    12/2004    Hershkowitz

FOREIGN PATENT DOCUMENTS

JP    59 009871    1/1984
JP    11 135140    5/1999

OTHER PUBLICATIONS

European Search Report dated Jul. 11, 2005.

* cited by examiner

*Primary Examiner*—Raymond Alejandro
(74) *Attorney, Agent, or Firm*—Paul L. Marshall

(57) ABSTRACT

A system for co-generation of electricity combining a hydrocarbon catalytic reformer, an SOFC assembly and a generator driven by a gas turbine. The fuel cell assembly recycles a high percentage of anode exhaust gas into the reformer. Oxygen for reforming is derived from water in an endothermic process. The stack exit temperature is normally above 800° C. DC power from the fuel cell assembly and AC power from the gas turbine generator are directed to a power conditioner. Anode exhaust gas including carbon monoxide and hydrogen is divided into a plurality of portions by which heat may be added to the reforming, gas turbine, and cathode air heating processes. Water may be recovered from the exhaust. A power system in accordance with the invention is capable of operating at a higher total efficiency than either the fuel cell component or the gas turbine component alone.

18 Claims, 3 Drawing Sheets

HYBRID POWER GENERATING SYSTEM COMBINING A FUEL CELL AND A GAS TURBINE

TECHNICAL FIELD

The present invention relates to means for generating electric power; particularly, to fuel cells and gas turbines; and more particularly, to a hybrid power generating system comprising an interactive solid oxide fuel cell and gas turbine for generating electric power.

BACKGROUND OF THE INVENTION

Fuel cells which generate electric current by controllably combining elemental hydrogen and oxygen are well known. In one form of such a fuel cell, an anodic layer and a cathodic layer are separated by a non-permeable electrolyte formed of a ceramic solid oxide. Such a fuel cell is known in the art as a "solid-oxide fuel cell" (SOFC). It is further known to combine a plurality of such fuel cells into a manifolded structure referred to in the art as a "fuel cell stack" and to provide a partially-oxidized "reformate" fuel ("syngas") to the stack from a hydrocarbon catalytic reformer.

Prior art catalytic partial-oxidizing (POX) reformers typically are operated exothermically by using intake air to partially oxidize hydrocarbon fuel as may be represented by the following equation for a hydrocarbon and air,

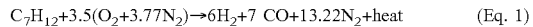

$$C_7H_{12} + 3.5(O_2 + 3.77N_2) \rightarrow 6H_2 + 7\,CO + 13.22N_2 + \text{heat} \quad \text{(Eq. 1)}$$

wherein the oxygen/carbon atomic ratio is 1.0, and the resulting reformate temperature is in the range of about 1000° C. Prior art reformers typically are operated slightly fuel-lean of stoichiometric to prevent coking of the anodes from non-reformed hydrocarbon decomposition within the fuel cell stack. Thus conventional combustion of hydrocarbon and reformate occurs within the reformer and within the stack in addition to, and in competition with, the electrochemical combustion of the fuel cell process. Such conventional combustion is wasteful of fuel and creates additional heat which must be removed from the reformate and/or stack, typically by passing a superabundance of cooling air through the cathode side of the stack.

It is known to produce a reformate containing hydrogen and carbon monoxide by endothermic steam reforming (SR) of hydrocarbon in the presence of water in the so-called "water gas" process, which may be represented by the following equation,

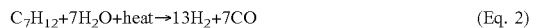

$$C_7H_{12} + 7H_2O + \text{heat} \rightarrow 13H_2 + 7CO \quad \text{(Eq. 2)}$$

wherein the oxygen/carbon atomic ratio is still 1.0 and the reformate temperature is still about 1000° C. The disadvantages of this process for providing reformate for operating a fuel cell are 1) a continuous water supply must be provided; 2) heat must be provided, typically in the form of burned fuel, thus reducing the efficiency of the system; and 3) the reforming temperature is hard on the reformer.

High temperature fuel cells inherently produce a combination of direct current electricity, waste heat, and syngas. The syngas, as used herein, is a mixture of unburned reformate, including hydrogen, carbon monoxide, and nitrogen, as well as combustion products such as carbon dioxide and water. In some prior art fuel cell systems, the syngas is burned in an afterburner, and the heat of combustion is partially recovered by heat exchange to the reformer, to the cathode inlet air, or to both.

In accordance with the invention disclosed in the co-pending and commonly owned patent application 10/793,302, entitled "Apparatus and Method for Operation of a High Temperature Fuel Cell System Using Recycled Anode Exhaust", a relatively small percentage, typically between 5% and 30%, of the anode syngas may be recycled into the reformer a) to increase fuel efficiency by endothermic reforming of water and carbon dioxide in the syngas in accordance with Equation 2 above (thus combining POX and SR reforming); b) to add excess water to the reformate to increase protection against anode coking; and c) to provide another opportunity for anode consumption of residual hydrogen. In such systems, and especially when using heavy fuels such as gasoline and diesel, the reformer typically is operated at a high temperature (which may even exceed the stack temperature) to provide the energy necessary for endothermic reforming. However, such high temperatures may be deleterious to the reformer over a period of time, and tend to lower system efficiency. From a durability point of view, it is desirable to be able to operate a reformer at the lowest temperature possible (without being in an operating region of carbon formation).

In a fuel cell stack, the reformate consumed is converted into approximately equal amounts of heat and electricity. The stack is cooled primarily by the flow of gases through it. Even with a modest amount of recycle flow added to the reformate, the total reformate massflow is relatively small, on the order of one-tenth the massflow of the cathode air, so the majority of cooling is done by cathode air. As previously noted, in endothermic reforming of recycled syngas, the reformate produced cannot be cooled below stack temperature without risk of carbon nucleation. Therefore, in order to keep a reasonable temperature gradient in the stack between the inlet and outlet of the cathode, a very high cathode air massflow is required, being many times the amount required for the electrochemistry of the stack. This creates an added energy parasitic to the stack in the form of a very large air blower, and also tends to make the size of the cathode heat exchanger much larger than would otherwise be necessary.

Gas turbines are well known for use in driving electric generators. Typically, a stream of hot gas is impinged against one or more bladed turbines mounted on a shaft of the generator. A typical gas turbine generator operates at about 38% fuel efficiency.

It is well known that a solid oxide fuel cell and a gas turbine can be integrated into a combined system known in the art as an SOFC/GT hybrid. Such systems have been commercialized on a limited or experimental basis, for example, by Siemens Westinghouse Power Corporation, using all ceramic high temperature stacks. Such a fuel cell system, running at a temperature of approximately 1000° C., is well matched to the thermal requirements of uncooled gas turbines, the system is inherently large and heavy; is high in materials and processing cost; and is slow in start-up time and in transient response.

Intermediate temperature SOFC stacks, operating at a nominal stack temperature between about 700° C. and 850° C. are expected to be smaller, less expensive, and more capable of fast start-up and transient response. However, the operating temperature is not so well suited to gas turbine integration.

As noted above, conventional cooling strategies for a conventional SOFC require considerable excess air on the cathode side and modest temperature differentials between the inlet and the exit of the stack. This results in a need for a relatively large heat exchanger for cathode air preheating, and a relatively large blower or compressor to supply air to the fuel cell.

What is needed in the art is a new configuration for an SOFC/GT hybrid that optimizes thermodynamic coupling of the SOFC and GT processes and allows the hybrid system to be operated with substantially less heat exchange required in fuel vaporization/reforming and in cathode air preheating. Such an optimized hybrid offers large reductions in system weight and cost, making such an auxiliary power unit (APU) system useful for applications in aerospace, aviation, road/rail/marine transport, and "containerized" distributed power generation.

What is further needed is a means for improving the efficiency of reformer and stack processes while operating the reformer at a temperature below the stack temperature; for minimizing the size and weight of the heat exchangers; and for retaining most or all of the latent heat value of the anode tail gas for downstream processes.

What is still further needed is means for increasing the fuel efficiency of a gas turbine generator.

What is still further needed is auxiliary power unit means for generating electricity which is relatively lightweight and highly fuel efficient.

It is a principal object of the present invention to provide electric power by combining high efficiency operation of a high temperature fuel cell system with a gas turbine generator.

BRIEF DESCRIPTION OF THE INVENTION

Briefly described, a system in accordance with the invention for co-generation of electricity combines a hydrocarbon catalytic reformer and an SOFC assembly with a generator driven by a gas turbine. The mode of operation of the fuel cell assembly recycles a high percentage of anode syngas into the reformer, preferably in excess of 50%, and as high as 95% for diesel fuel. This mode is referred to herein as "extreme recycle." Although air must be supplied to the reformer at start-up, after the system reaches equilibrium operating conditions some or all of the oxygen required for reforming of hydrocarbon fuel is derived from endothermically reformed water and carbon dioxide in the syngas. The recycle rate is considerably higher than the minimum required to supply these oxidants to the fuel. However, the high atomic oxygen/carbon ratio allows lower reforming temperature, in the range of about 650° C. to 750° C., without carbon formation, even with heavy fuels such as gasoline, diesel, or jet fuel. This temperature is sufficiently lower than the stack exit temperature of about 800° C. to 880° C., or higher, that most or all of the required endotherm can be provided by the sensible heat of the recycled syngas.

The high stack exit temperature is achieved by having approximately equal cooling from the anode and cathode sides of the stack. The cathode air flow is significantly reduced over that of the prior art. Overheating of elements within the stack is prevented by configuring the approximately equal anode and cathode gas flows in opposite directions through their respective gas spaces ("counterflow"), such that entering reformate cools the exiting region of the cathode and exiting cathode air, and entering cathode air cools the exiting region of the anode and the exiting syngas. This is a significant improvement over the prior art cross-flow or co-flow arrangements which inherently have an area of the stack and gas seals running undesirably close to, or even above, the syngas exit temperature.

DC electric power generated by the fuel cell assembly is directed to a power conditioner.

Endothermic reforming provides a significant amount of residual hydrogen in the anode tail gas; thus, the fuel cell assembly may be thought of as a source of electricity, syngas including carbon monoxide and hydrogen, and high grade waste heat. Preferably, the anode tail gas flow is divided into recycle and non-recycle streams. The non-recycle stream is further divided into three portions by which heat may be efficiently added to the reforming, gas turbine, and heat recovery processes. A first portion is directed into a first combustor downstream of the fuel cell assembly wherein the anode tail gas and cathode exhaust air are mixed and burned. The first combustor exhaust is directed through the reformer heat exchanger to assist in providing heat for the endothermic process and then is passed into a second combustor where the second portion is added and burned. The exhaust from the second combustor is directed to the turbines of a gas turbine electric generator that produces AC electric power that is also sent to the power conditioner wherein the AC and DC inputs from the turbine generator and fuel cell assembly are electrically rationalized to meet the needs of a particular power requirement, for example: 480 volts AC. The exhaust from the turbine preferably is directed to a third combustor wherein a third anode syngas portion is burned and the exhaust is directed through the cathode intake air heat exchanger. The turbine preferably also drives an air compressor for supplying combustion and cooling air to the fuel cell system via the cathode air heat exchanger. From the heat exchanger, the anode exhaust may be directed through a water condenser wherein cooling air is employed to recover the water of combustion from the exhaust. In aircraft and space applications, water recovery can be an important feature of a hybrid system which is not readily available from the exhaust of a conventional gas turbine generator because it is less dilute.

A hybrid co-generation system in accordance with the invention is capable of operating at a higher total efficiency than either the fuel cell component or the gas turbine component alone.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
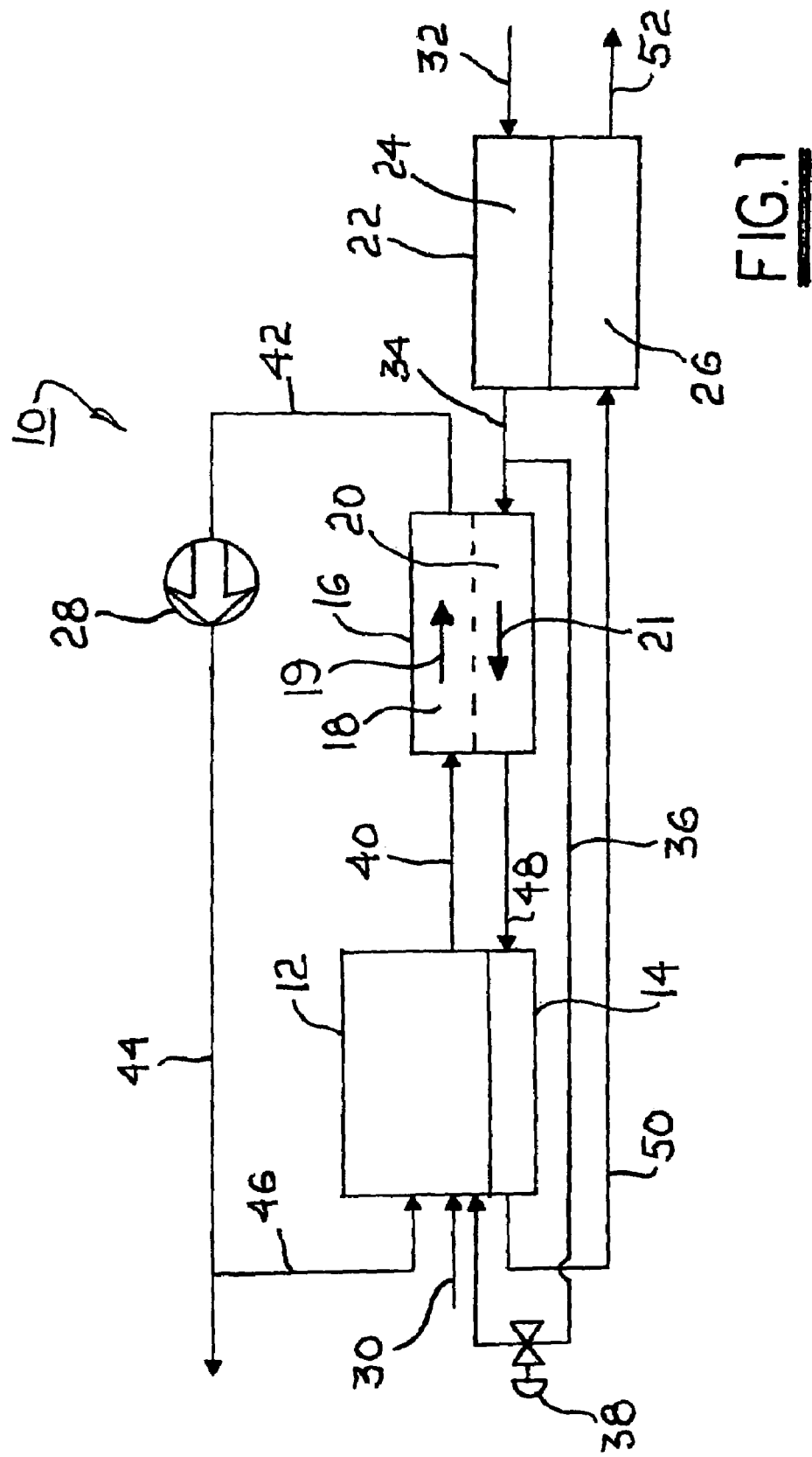
FIG. 1 is a schematic drawing of a high temperature fuel cell system in accordance with the invention.

Referring to FIG. 1, a high temperature fuel cell system 10 includes components known in the art of solid-oxide or molten carbonate fuel cell systems. FIG. 1 is not a comprehensive diagram of all components required for operation but includes only those components necessary to understand the apparatus and method in accordance with the invention. Other components not shown will be readily inferred by those of ordinary skill in the art. A hydrocarbon catalytic reformer 12 includes a heat exchanger 14, preferably formed integrally therewith. A fuel cell stack 16 comprises preferably a plurality of individual fuel cell elements connected electrically in series as is known in the art. Stack 16 includes passageways for passage of reformate across the anode surfaces of the stack, the passageways being shown collectively and schematically as passageway 18. Stack 16 also includes passageways for passage of air across the cathode surfaces of the stack, the passageways being shown collectively and schematically as passageway 20. Preferably, passageways 18 and 20 are arranged within stack 16 such that reformate flows across the anode surfaces in a direction different from the direction of air flow across the cathode surfaces. Preferably, the reformate flow and airflow directions 19, 21 are directly opposed (counterflow) instead of crossing (crossflow), as is well known in the prior art, or flowing in the same direction (coflow). A cathode air heat exchanger 22 includes an intake air side 24 and an exhaust air side 26. A pump 28 optionally is provided for recycling a portion of the anode tail gas, or syngas, into an inlet of the reformer, and for exporting syngas to an external process.

Endothermic reforming with high percentage syngas recycle may be represented by the following equation,

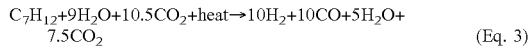

(Eq. 3)

wherein the oxygen/carbon ratio is 1.715, and the reformate temperature is about 750° C. Thus ⁴⁄₅ of the hydrogen consumed to produce water in the electrochemical process of the fuel cell stack is recovered by endothermic reforming and is used over again, thus greatly increasing the hydrocarbon fuel efficiency of the system, or is available for other uses of the syngas, such as powering a gas turbine in accordance with the invention. Further, the energy required for the water reforming is derived from the "waste" energy in the anode syngas which in prior art high temperature fuel cells is discarded in the superabundance of cathode cooling air.

In operation, fuel is controllably supplied from a source (not shown) via line 30 to an inlet of reformer 12, as is known in the art. In principle, fuel may comprise any conventional or alternative fuel as is known in the art, for example, gasoline, diesel, jet fuel, kerosene, propane, natural gas, carbon, biodiesel, ethanol and methanol. Air is supplied from a source (not shown), such as a blower or other air pump, via line 32 to intake air side 24 of heat exchanger 22 and thence via line 34 to cathode passageway 20. At start-up, heated air is also supplied from heat exchanger 22 via line 36 to an inlet on reformer 12 to provide oxygen for reformer start-up in known fashion. At a time after start-up when such air is no longer needed, or may be reduced in volume in accordance with the invention, the air flow to the reformer may be controllably modulated by an air valve 38.

Reformate is supplied via line 40 from reformer 12 to anode passageway 18. Syngas, or anode tail gas, is exhausted from stack 16 via line 42 and is preferably assisted by inline pump 28. Syngas is exhausted from pump 28 via line 44, and a portion of the exhausted syngas may be recycled to an inlet of reformer 12 via line 46. Preferably, the recycled portion in line 46 is between about 50% and about 95% of the total syngas flow in line 44.

Heated cathode air is exhausted from cathode passageway 20 via line 48 and is provided to reformer heat exchanger 14 wherein heat is abstracted to assist in reforming processes within reformer 12. In an extreme recycle SOFC operated in stand-alone mode, spent air is exhausted from heat exchanger 14 via line 50 and is passed through exhaust side 26 of heat exchanger 22 wherein heat is abstracted by intake air in inlet side 24. Cooled air is discharged to atmosphere via line 52.

In an exemplary method of operation of system 10 in accordance with the invention, syngas flow being recycled to reformer 12 via line 46 is at least about 75%, and preferably between about 90% and 95%, of the total syngas amount flowing through line 44. This is in contrast with prior art recycle flows of about 25% or less. Fuel, recycle syngas, and oxidant flows to reformer 12 are adjusted in known fashion such that reformate flow in line 40 to stack 16 is about 6.4 grams/second at a temperature of about 650° C. Air flow through line 34 to stack 16 is about 8.0 grams/second at a temperature of about 680° C. Stack 16 is sized such that syngas is exhausted from passageway 18 at a temperature of about 840° C. and air is exhausted from passageway 20 at a temperature of about 840° C.

Under these or similar steady-state operating conditions, little or no air must be provided to reformer 12 via line 36 and valve 38. Sufficient heat is provided to the reformer from the sensible heat of the recycled tail gas to permit endothermic reforming of the input fuel and the water and carbon dioxide in the syngas. Most or all of the needed reforming oxygen is derived from the water and carbon dioxide.

Note that the reformer is thus permitted to operate at a significantly lower temperature (reformate temperature 650° C.) than in the prior art exothermic reforming (reformate temperature >800° C.), which is highly beneficial to longevity of the reformer catalyst.

Note also that most, if not all, of the oxygen required for reforming is obtained from the water and carbon dioxide in the recycled syngas via endothermic reforming, which oxygen ultimately derives from cathode oxygen that has migrated through the electrolyte for reaction at the anode in the stack.

Note also that the stack is permitted to operate at a higher average temperature due to improved internal heat control from counterflow reformate/air pathways. This allows the active area of the electrolyte to have a flatter temperature profile closer to the thermal limits of the stack seals and interconnects, thus improving power density and system efficiency.

Note also that the improved stack cooling and resulting higher stack temperature provides a hotter cathode air effluent which allows heat exchangers 14,26 to be downsized.

Note also that the high recycle rate of syngas allows the cooler reformate to participate more fully in temperature control of the stack and thus requires substantially less cathode airflow, thus permitting the air pump to be downsized.

Note also that endothermic reforming under the above conditions provides a relatively high percentage of residual hydrogen in the anode tail gas.

Figure 2:
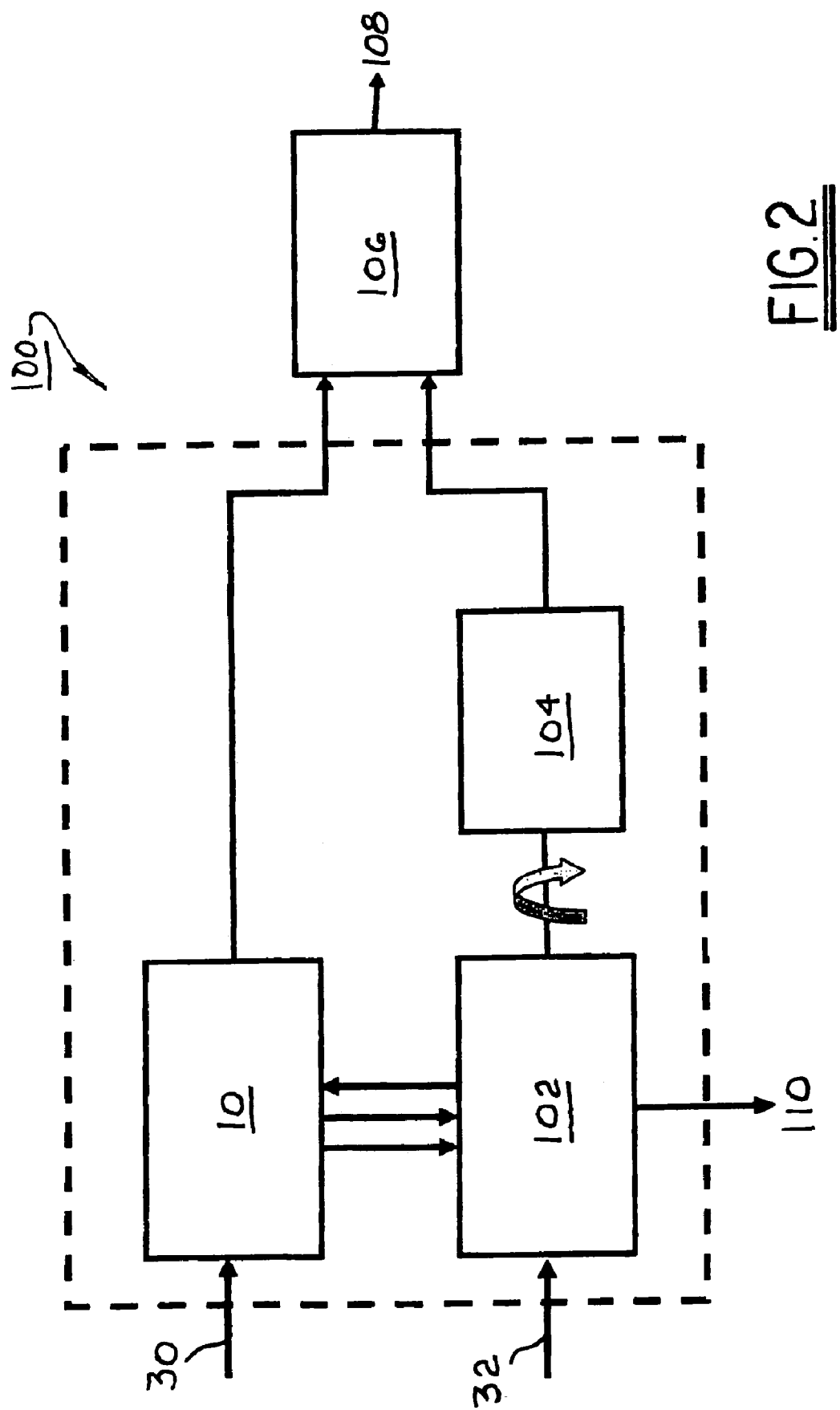
FIG. 2 is a simplified schematic drawing of a hybrid auxiliary power system in accordance with the invention.

Referring now to FIG. 2, a hybrid auxiliary electric power unit 100 in accordance with the invention includes an SOFC fuel cell system 10 for generating DC electric current symbiotically joined with a gas turbine, shown generically as a turbomachine 102, and generator 104 for generating AC electric current, both currents being directed to an electric power conditioner 106 as is known in the art whereby the DC and AC currents are combined and converted as needed for a specific use 108. In addition to generating electricity, the fuel cell system provides a hot gas exhaust for driving the turbomachine, and the turbomachine provides a pressurized flow of air to the fuel cell system. Water 110 may be readily recovered from system 100. Fuel cell system 10 is operated in extreme recycle mode, as described hereinabove.

Figure 3:
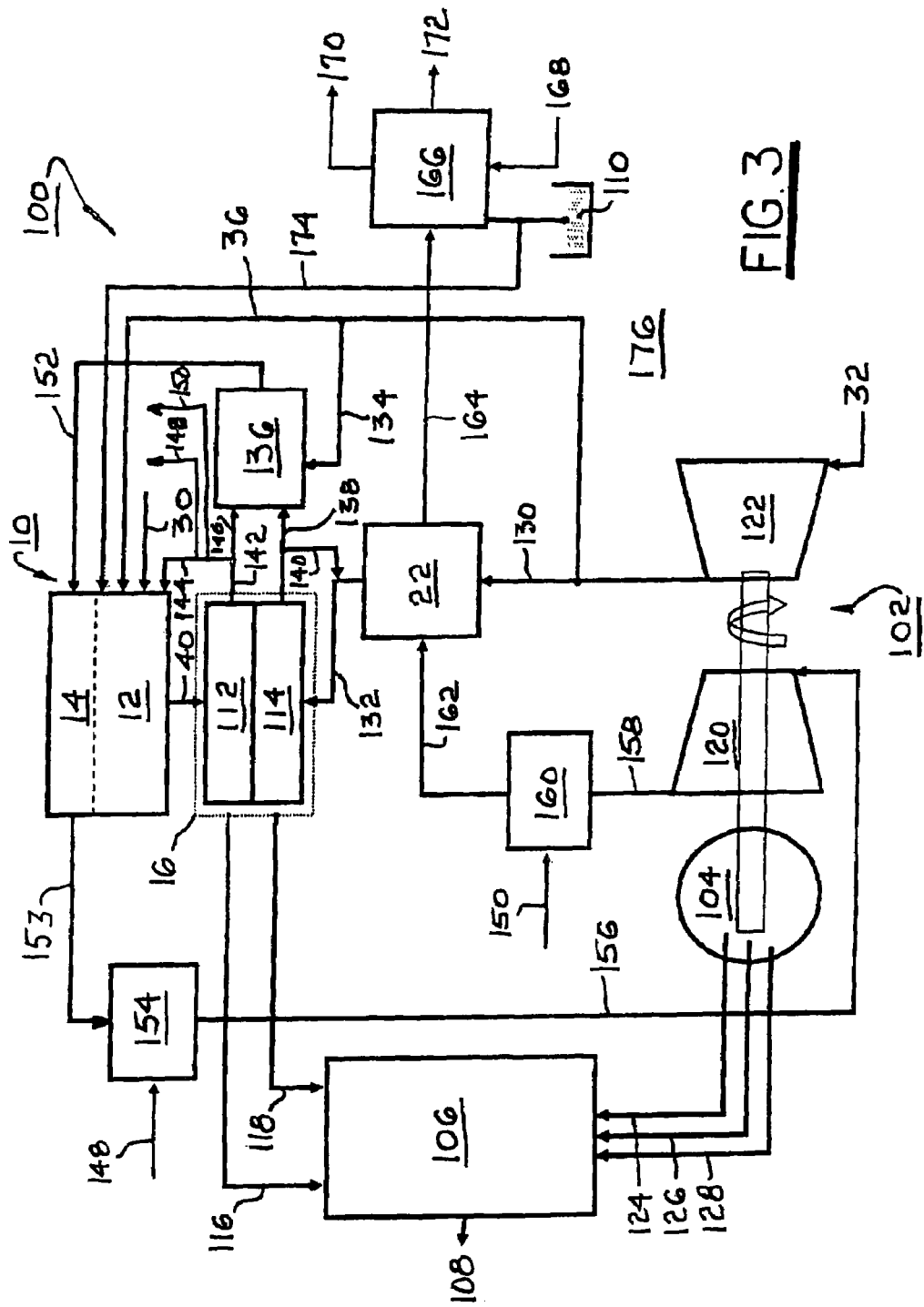
FIG. 3 is a more detailed schematic drawing of a hybrid auxiliary power system in accordance with the invention.

Referring to FIG. 3, in hybrid system 100 in accordance with the invention, a gas turbine system functionally enfolds the above described SOFC fuel cell system. The objective is to use the gas turbine to supply hot compressed gas to the SOFC, resulting in lower parasitic losses from air compression, and to use the SOFC to provide heat and by-product fuel (syngas) for use in the gas turbine.

Fuel cell system 10 includes a fuel cell stack 16, comprising an anode portion 112 and a cathode portion 114, and a hydrocarbon reformer 12 including an integral heat exchanger 14. Fuel cell stack 16 is electrically connected by leads 116,118 to power conditioner 106.

Fuel cell stack 16 is operable substantially as described for system 10 hereinabove. By use of extreme recycle, the reforming process and stack cooling are improved. This allows the system to be operated with higher combustion temperatures and richer (fuel/air) overall equivalence ratios, reducing system massflows, especially in air flow. Both the higher temperature and the lower massflow serve to significantly improve energy recovery in the gas turbine and to reduce the size and hence weight and cost of the heat exchangers in the system.

Turbomachine 102 includes a gas turbine 120 and a turbine compressor 122 and is mechanically connected to generator 104 for generating AC current which is directed to power conditioner 106 by leads 124,126,128.

The fuel cell system 10 and the gas turbine system 102 are symbiotically and optimally related as follows, beginning arbitrarily with turbine compressor 122 and the cathode side of the fuel cell.

Ambient air 32 is drawn into compressor 122 wherein the air is compressed and directed 130 to cathode air heat exchanger 22 wherein the air is heated and further directed 132 into cathode portion 114. A portion of the compressed air generated by compressor 122 may be directed 36 into hydrocarbon reformer 12 as described above for exothermal reforming at start-up. An additional compressed air portion may be directed 134 as needed into a first syngas combustor 136 for use as described below. Cathode air exhaust from cathode portion 114 is also directed 138 into combustor 136, and a portion of the cathode air exhaust may be recycled 140 back into the cathode.

Referring to the anode side of the fuel cell, hydrocarbon fuel 30 is reformed in reformer 12, and reformate is directed 40 into anode portion 112 of SOFC 16. Except for start-up, SOFC system 12 is operated as described above in extreme recycle mode. Anode tail gas (syngas) being exhausted 142 from anode portion 112 is divided into a plurality of individually controlled streams, preferably at least four 144,146, 148,150. By splitting the anode exhaust stream into three or more streams, heat may be efficiently added to the reforming, gas turbine, and heat recovery processes. This gives flexibility in responding to transients such as fast start-up or load following and allows tuning of heat release so that appropriate maximum temperatures are observed, to protect materials of construction. In this fashion, the heat value of the anode exhaust stream may be tuned for optimal performance of the various system components including the hydrocarbon reformer, the gas turbine assembly, and the cathode heat exchanger.

The syngas is exhausted from the stack at very high temperature, preferably at least about 800° C. and more preferably at least about 900° C., and contains substantial residual hydrogen and carbon monoxide fuels. Stream 144 represents the extreme recycle portion back into reformer 12. Stream 146 is directed into first combustor 136 where it is mixed with the hot, spent cathode air 138 and, optionally, with fresh air 134 and is burned to provide a hot exhaust 152 which is passed through reformer heat exchanger 14 to provide additional heat for endothermic reforming. The cooled exhaust 153 still containing residual oxygen, is passed into a second syngas combustor 154 where it is mixed with syngas stream 148 and burned to provide a hot exhaust 156 for driving gas turbine 120. Exhaust 156 is preferably hotter than about 900° C. Turbine 120 drives compressor 122 and generator 104 as described above. Exhaust 158 from turbine 120, still containing residual oxygen, is passed into a third combustor 160 wherein it is mixed with syngas stream 150 to provide a hot exhaust 162 for heating cathode air stream 130 in cathode air heat exchanger 22. Again, exhaust 162 is preferably hotter than about 900° C., thus providing a high unit heat input into exchanger 22 and permitting a substantial reduction in size of the heat exchanger over the prior art.

Exhaust 164 from heat exchanger 22 is cooled and is highly moist, containing all the combustion water from stack 16 and combustors 136,154,160. Water 110 may be conveniently recovered from exhaust 164 any of several known processes, such as, but not limited to, by passing the exhaust through a condenser 166 cooled by ambient air 168, providing warmed air 170 for space heating in the process. In a vehicle 176 application for system 100, such as in an aircraft or truck, air 168 may be gathered and circulated from outside the vehicle. Alternatively, cooling air may be supplied (not shown) from compressor 122. Cooled exhaust 172 is passed to the atmosphere. Water 110 is available for drinking as needed and/or may be recirculated 174 back into reformer 12 as needed for endothermic reforming or for periodic sulfur or carbon removal from the anodes.

While the invention has been described by reference to specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for generating electric power, comprising:
   a) a solid oxide fuel cell assembly having an anode portion and a cathode portion for producing a first electric power from hydrogen-containing reformate supplied by a hydrocarbon reformer, and for producing a cathode air exhaust stream and a hydrogen-containing anode exhaust stream;
   b) a gas turbine assembly configured for driving a generator for producing a second electric power; and
   c) a first combustor for producing a first high temperature exhaust from a burning of substantially all of said cathode air exhaust stream with a first portion of said anode exhaust stream, at least a portion of said first high temperature exhaust being used to drive said gas turbine assembly,
   wherein a second portion of said anode exhaust stream is recycled into said reformer.

2. A system in accordance with claim 1 further comprising an air compressor driven by said gas turbine assembly for supplying compressed air to said fuel cell system.

3. A system in accordance with claim 1 wherein said system includes a reformer heat exchanger, wherein said first combustor is disposed between said anode portion and said reformer heat exchanger for burning said first portion of said anode exhaust stream to provide said first high temperature exhaust to said reformer heat exchanger.

4. A system in accordance with claim 3 further comprising a second combustor disposed between said reformer heat exchanger and said gas turbine assembly for burning a portion of said first high temperature exhaust from said reformer heat exchanger to provide a second high temperature exhaust for driving said gas turbine assembly.

5. A system in accordance with claim 4 wherein said system includes a cathode air heat exchanger, said system further comprising a third combustor disposed between said gas turbine assembly and said cathode air heat exchanger for burning a portion of said second high temperature exhaust from said gas turbine assembly to provide a third high temperature exhaust to said cathode air heat exchanger.

6. A system in accordance with claim 5 further comprising a water recovery mechanism for recovering water from said third high temperature exhaust after passing through said cathode air heat exchanger.

7. A system in accordance with claim 6 wherein recovered water is added back to said hydrocarbon reformer.

8. A system in accordance with claim 1 further comprising a power conditioner for combining said first and second electric powers.

9. A system in accordance with claim 1 wherein said first electric power is DC and said second electric power is AC.

10. A system in accordance with claim 1 configured to produce said anode exhaust stream at a temperature of at least 800° C.

11. A system in accordance with claim 1 wherein said fuel cell assembly is configured such that reformate is passed through said anode portion in a first direction and air is passed through said cathode portion in a second direction opposite to said first direction.

12. A system in accordance with claim 1 wherein said system is an auxiliary power unit.

13. A system in accordance with claim 1 wherein said second portion of said hydrogen-containing anode exhaust stream includes at least 50% of said hydrogen-containing anode exhaust stream.

14. A system in accordance with claim 13 wherein said second portion of said hydrogen-containing anode exhaust stream includes at least 75% of said hydrogen-containing anode exhaust stream.

15. A system in accordance with claim 1 wherein said second portion of said anode exhaust stream is recycled to the reformer from a point upstream of said first combustor.

16. A vehicle having an auxiliary power unit comprising a system for generating electric power, including a solid oxide fuel cell assembly having an anode portion and a cathode portion for producing a first electric power from hydrogen-containing reformate supplied by a hydrocarbon reformer, and for producing a cathode air exhaust stream and a hydrogen-containing anode exhaust stream, a gas turbine assembly configured for driving a generator for producing a second electric power; and a combustor for producing a first hitch temperature exhaust from a burning of substantially all of said cathode air exhaust stream with a first portion of said anode exhaust stream, at least a portion of said first high temperature exhaust being used to drive said gas turbine assembly, wherein a second portion of said anode exhaust stream is recycled into said reformer.

17. A vehicle in accordance with claim 16 wherein said second portion of said hydrogen-containing anode exhaust stream includes at least 50% of said hydrogen-containing anode exhaust stream.

18. A vehicle in accordance with claim 16 wherein said second portion of said anode exhaust stream is recycled to the reformer from a point upstream of said combustor.

* * * * *